United States Patent [19]
Webber

[11] 4,446,553
[45] May 1, 1984

[54] ARRANGEMENT FOR MULTIPLE CUSTOM CALLING

[75] Inventor: Robert C. Webber, Glendale, Ariz.

[73] Assignee: GTE Automatic Electric Labs Inc., Northlake, Ill.

[21] Appl. No.: 316,268

[22] Filed: Oct. 29, 1981

[51] Int. Cl.³ .................................................. H04Q 11/04
[52] U.S. Cl. ................................. 370/62; 179/18 BG; 179/18 BC
[58] Field of Search .................. 370/62, 63; 179/18 B, 179/18 BC, 18 BG

[56] References Cited

U.S. PATENT DOCUMENTS

| | | | |
|---|---|---|---|
| 3,504,123 | 3/1970 | Fischer et al. | 370/62 |
| 3,517,135 | 6/1970 | Fisch et al. | 370/62 |
| 3,967,070 | 6/1976 | Srivastava et al. | 370/62 |
| 3,997,731 | 12/1976 | Wilmot et al. | 179/18 B |

FOREIGN PATENT DOCUMENTS

| | | | |
|---|---|---|---|
| 52-20712 | 2/1977 | Japan | 179/18 BG |
| 52-56063 | 5/1977 | Japan | 179/18 BG |

OTHER PUBLICATIONS

Cotton, "ITT 1240 Digital Exchange", Electrical Communication, vol. 54, No. 3, 1979, pp. 215–224.

Primary Examiner—Douglas W. Olms
Attorney, Agent, or Firm—Frank J. Bogacz; Robert J. Black

[57] ABSTRACT

The arrangement described herein provides for simple control and minimal program impact of a central office switching system for interfacing multiple custom calls. This arrangement employs a few simple trunks connected in a loop around configuration. The arrangement shown considers the establishment of a three way call by a three way calling subscriber who is already engaged as a non-control party in another custom calling subscriber's call waiting call.

4 Claims, 4 Drawing Figures

ARRANGEMENT FOR MULTIPLE CUSTOM CALLING

CROSS-REFERENCE TO RELATED APPLICATIONS

The present application is related to copending U.S. patent applications Ser. Nos. 316,252; 316,254; 316,255; and 316,377, having the same inventive entity and being assigned to the same assignee.

BACKGROUND OF THE INVENTION (1) Field of the Invention

The present invention pertains to multiple custom telephone calling features and more particularly to an arrangement for controlling these custom calling features which interface with one another in a common central office.

(2) Description of the Prior Art:

As computerization was introduced into telephone switching offices, it was understood that more complex functions could be provided by the switching office. Among these functions are such features as special ticketing and billing arrangements and custom calling features such as three way calling, call forwarding, speed calling, and call waiting. To implement each of these special custom calling features complex hardware in the form of trunk circuits and complex programs in the central processing unit of the switching office are required.

When these custom calling features interface with one another further complexity is added to both the trunking arrangement and the program. Among these features the more complex are call waiting and three way calling. These features are the most complex since they require the greatest amount of hardware and program to handle their operation. Call waiting service is defined as: A call waiting subscriber will hear a short tone, if he is already using his line and the second party is attempting to reach him. The second party receives normal ring back tone and the line is split, so that only the subscriber to be called will hear the short tone. The tone will be repeated in 10 seconds as a reminder, and if unanswered, the second party will receive ring back tone. If the subscriber wants to end his first call he simply hangs up and his phone will ring with the second party on the line. If he wants to hold the first party while answering the second, he presses the hookswitch for one-half a second. With this method he can switch between parties at will.

Three way calling service is defined as: A three way calling subscriber can add a third party to an existsing conversation. While the subscriber is conversing with another party, a third party can be added to the conversation by depressing his hookswitch for one-half a second. This puts the original party on hold, and the subscriber will hear a special dial tone (3 spurts of tone followed by regular dial tone). He can then dial the third party and hold a private conversation with the third party. To establish the three way connection the subscriber must again depress its hookswitch for one-half a second. If the third party did not answer or if the subscriber wants to drop a third party from the three way call, he simply depresses his hookswitch for one-half a second and the original parties are re-established (and the subscriber may again establish a three way call). To disconnect, the subscriber simply hangs up and all connections will be broken down.

These custom calling features required specialized trunk arrangements and complex program for the manipulation of the connection of parties in response to hookswitch flashing. Arrangements for connecting custom calling subscribers individually are shown in an article entitled "Custom Calling Services on No. 1 EAX" by J. D. McLean in the GTE Automatic Electric Technical Journal, July, 1976, Vol. 15-No. 3. This article shows basic configurations for the establishment of call waiting and three way calling custom features as independent calls. This article shows the special trunks and junctors which were developed for the implementation of these custom calling features. However, the article does not deal with the interconnection of these custom calling features to one another and the resulting complexity added by this arrangement.

One manner in which to handle the problem of interacting custom calls is to prevent subscribers from calling other subscribers who have active custom calling features. This is not a suitable solution since certain subscribers would be unable to reach whomever they chose to call. Another solution is to provide complex trunks or to increase the logic of the controlling program to accommodate all the interactions of two interacting custom calls. However this situation results in expensive trunk arrangements which are undesirable since they increase the cost of the custom calling feature to the subscriber.

The above mentioned problems are further compounded when both of the interacting custom calls are made from the same switching office. This situation means that one switching office must control the operation of multiple custom calls, making the interacting decisions very complex.

Accordingly it is the object of the present invention to provide a simple trunking arrangement and program for the operation of multiple interacting custom calls within a particular telephone switching office for a three way calling subscriber who is not the controlling party in a call waiting call.

SUMMARY OF THE INVENTION

The present invention comprises an arrangement for multiple custom calling telephone calls within a switching office. Two telephone subscribers with custom calling service features (one with call waiting service and the other with three way calling service) are connected to another POTS (plain old telephone service) subscriber in a call waiting call via a switching network of the switching office. The custom call subscriber, who is not the controlling party in the existing call waiting call, attempts to establish a three way call with himself as the controlling party between the other custom calling subscriber and a second POTS subscriber.

When the custom calling subscriber activates his three way calling feature by flashing his hook-switch, a multiple custom calling situation is detected by the stored program of the CPU. The original call waiting call and the new request for a three way call interact.

Each telephone subscriber is connected via a line circuit to the switching network. When the stored program detects the non-control custom caller's request for a three way call, the program must first determine whether the requesting subscriber is a custom caller. The requesting custom caller must be temporarily disconnected from the existing call waiting call, however the requesting custom caller's path must be held by the program so that his connection is not completely dropped from the switching office.

Next, a three way call trunk must be selected and connected to the requesting custom caller via the switching network under program control. Then, a talking path is established from the three way call trunk through the switching network to a loop around trunk by the program and simultaneously a second talking path is established from the loop around trunk via the switching network to the controlling party in the original call waiting call by the program. Lastly, the program establishes a talking connection from the second POTS subscriber, who is a called party in the three way call, through the switching network to the three way calling trunk.

It should be noted that a custom calling subscriber may have only one custom calling feature active at any one time. In the example above, if the controlling call waiting subscriber was also the requesting party in the three way call, the request for the three way call would not be acted upon by the switching office.

As a result, the two custom calling subscribers are separated by the loop around trunk. The hookswitch flashed of these subscribers can be simply and easily interpreted by the trunk circuit and stored program.

The original call waiting call is re-established between the controlling custom caller, the first POTS subscriber and the three way calling custom caller via the loop around trunk. The three way call is established between the second custom caller as the controlling party, the second POTS subscriber and the controlling custom caller in the call waiting call via the loop around trunk. The two custom calls operate as though they were located in different switching offices. The program logic required is minimized because outgoing custom calls are handled similar to intra-office custom calls.

DESCRIPTION OF THE PREFERRED EMBODIMENT

Figure 1:
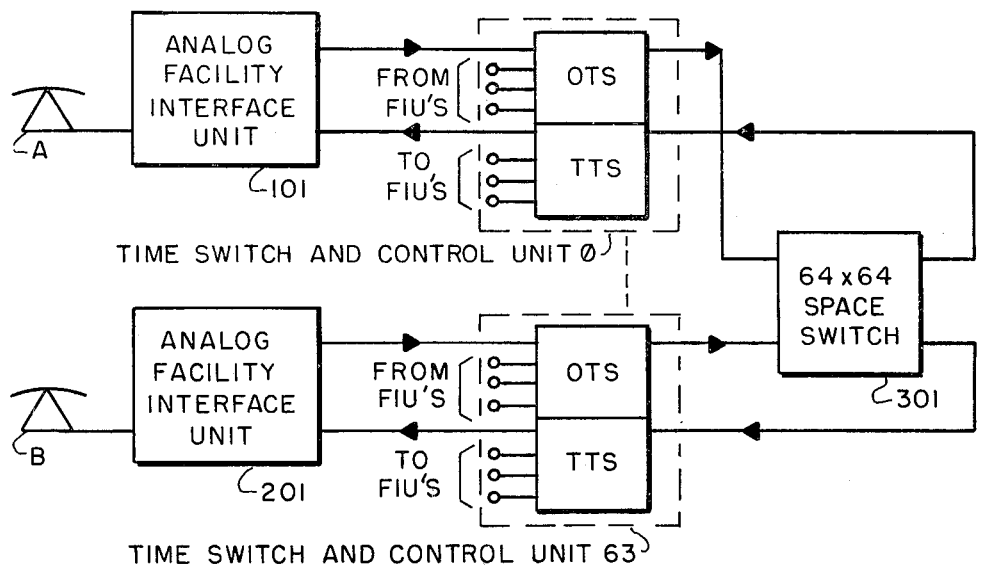
FIG. 1 is a block diagram depicting the overall network structure of associated with the present invention.

FIG. 1 is a block diagram showing a T-S-T network of a digital switching center for switching a local to local telephone call between POTS subscribers. Subscriber A is connected via an analog facility interface unit (FIU) 101. The analog FIU 101 has a PCM voice connection to time switch and control unit (TCU) 0. Each TCU has 2 time stages associated with it, an originating time stage (OTS) and a terminating time stage (TTS).

A connection is made from the OTS of a particular TCU to the 64 by 64 space switch 301. Then, a connection is established between the space switch 301 and the terminating time stage of TCU 63, for example. Subscriber B is connected through analog FIU 201 to the TTS of TCU 63.

Next a voice transmission link is established from subscriber B to subscriber A. This communication link is established via FIU 201, the OTS of TCU 63, through space switch 301, through the TTS of TCU 0, through analog FIU 101 to subscriber A. As a result, a full talking path has been established between subscribers A and B.

Figure 2:
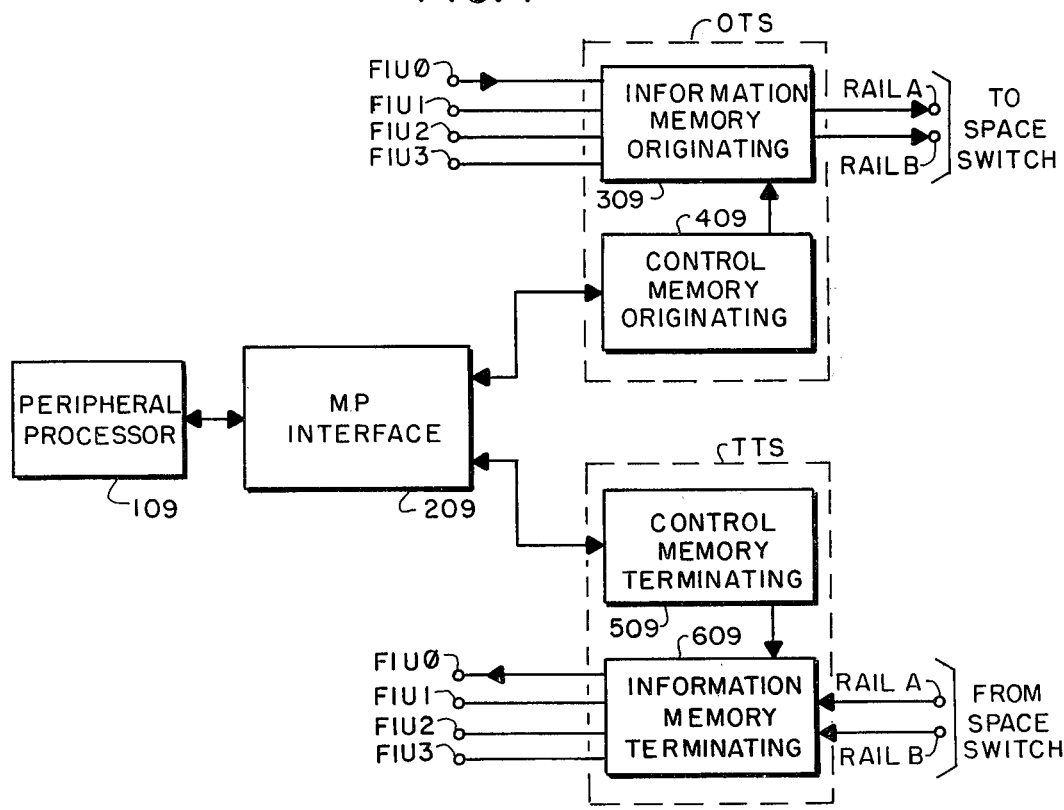
FIG. 2 is a block diagram depicting the originating and terminating time stages of the present invention and their connection to the central processing unit.

FIG. 2 shows the connection of a particular TCU to a corresponding microprocessor CPU 109. Each stage of a time and control unit includes an information memory and a control memory. For example, the originating time stage OTS shown includes an information memory 309 and a control memory 409. Microprocessor interface 209 connects the CPU 109 to the control memories 409 and 509.

The information memories 309 and 609 each contain information memory units with PCM samples. Up to four FIU's may be connected to each TCU. These FIU's may be analog line FIU's, connecting telephone subscribers to the network, as shown in FIG. 1 or analog trunk FIU's for connecting calls to service or outgoing trunk circuits.

Figure 3B:
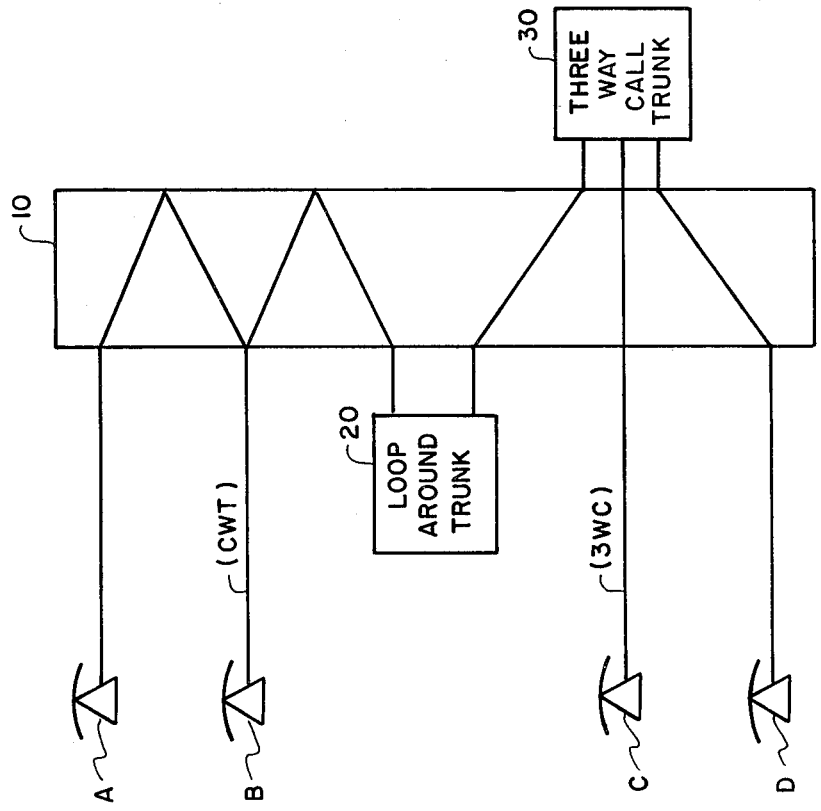
FIG. 3B is a block diagram depicting the multiple custom calling network arrangement of a call waiting and a three way calling subscriber in accordance with the present invention.
Figure 3A:
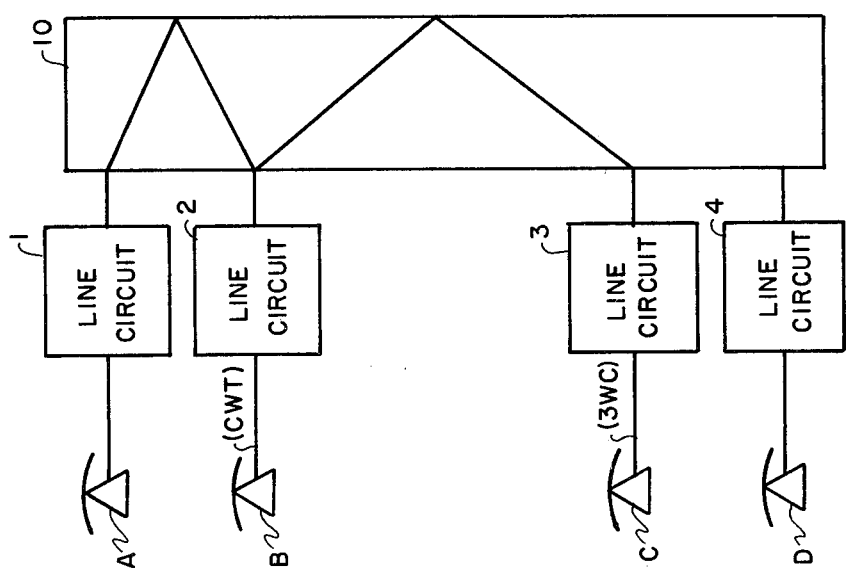
FIG. 3A is a block diagram depicting an existing call waiting call between two custom callers and another subscriber.

Referring now to FIG. 3A, network 10 includes such elements as analog FIU's, time switch and control units, which further include information and control memories, and a space switching stage. The configuration shown is that three subscribers A, B and C are connected in a call waiting call with subscriber B as the controlling party. Each of the subscribers A through D is connected to the switching network 10 via a line circuit 1 through 4 respectively.

Subscriber B is shown to have call waiting service (CWT). Subscriber C is a three way calling subscriber (3WC). Subscribers A and D are plain old telephone service (POTS) subscribers.

When subscriber C flashes his hookswitch indicating he wishes to place a three way call, a sensor in line circuit 3 detects this condition and signals the program to connect a digit receiver to subscriber C for collecting the new called party's digit. Subscriber C is attempting to dial subscriber D. To accomplish this, subscriber C is momentarily disconnected from the existing call waiting call. Also under direction of the program, subscriber C's line is provided with hold to avoid dropping the connection.

Referring to FIG. 3B, the program connects subscriber C through switching network 10 to a three way calling trunk 30. Next, the program selects a loop around trunk 20 having input and output connections to the same switching network 10. Then, the program selects a path from controlling call waiting subscriber B through switching network 10 to loop around trunk 20 and a second path from loop around trunk 20 through switching network 10 to three way calling trunk 30. Lastly, subscriber D is connected through switching network 10 to three way calling trunk 30 via control of the program.

As a result of these connections, two independent custom calls exist, first one call waiting call between subscriber A, subscriber B the controlling subscriber and three way calling trunk 30 via loop around trunk 20; and, the second one a three way call between subscriber C the controlling subscriber, subscriber D and subscriber B via loop around trunk 20. Hookswitch flashes of subscriber B are interpreted by the program via a sensor associated with this subscriber's line circuit and not forwarded through loop around trunk 20 and similarly hookswitch flashes of subscriber C are interpreted by sensors with its respective line circuit and not forwarded through loop around trunk 20. Therefore, the hookswitch flashes of these subscribers do not interact and require complex logic to determine the type of request being made. The two custom calls are logically separated and handled as though the connection through loop around trunk was a connection to another switching office. As a result trunk control logic and program logic are minimized. In addition, the program logic required for outgoing custom calls and intraoffice custom calls may be similar resulting in the great savings of program logic. The program logic saved via loop around this configuration is equivalent to approximately 1000 manhours of design development time.

It is to be noted that the complex situation of subscriber disconnects during multiple custom calls is handled as though only a single custom call was involved. This is a further result of the separation via loop around trunk 20 of the two custom calls.

Although a preferred embodiment of the invention has been illustrated and that form described in detail, it will be readily apparent to those skilled in the art that various modifications may be made therein; without departing from the spirit of the invention or from the scope of the appended claims.

What is claimed is:

1. In a telephone switching office, an arrangement for multiple custom calling comprising:

a CPU;

a switching network connected to said CPU;

a plurality of telephone subscribers connected to said switching network including at least a first and a second custom calling subscriber and a third and a fourth telephone subscriber;

said first and second custom calling subscribers and said third telephone subscriber engaged in an active call waiting call with said first custom calling subscriber as the controlling party of said active call waiting call;

means for detecting a request for a three way call from said second custom calling subscriber to call said fourth subscriber, said means for detecting connected to said switching network and being operated to transmit said request to said CPU;

means for holding said connection of said second custom calling subscriber with said first custom calling subscriber and said third telephone subscriber, said means for holding being connected to said switching network and operated in response to said request to said CPU for said three way call;

means for temporarily disconnecting said second custom calling subscriber from said call waiting call, said means for temporarily disconnecting being connected to said switching network and operated in response to said request to said CPU for said three-way call;

first means for connecting a plurality of subscribers, said first means for connecting being connected to said switching network;

said second custom calling subscriber and said fourth subscriber, each connected to said first means for connecting via a separate talking path through said switching network;

second means for connecting two telephone subscribers within the same switching office, said second means for connecting being connected to said first custom calling subscriber via said switching network and further being connected to said first means for connecting via said switching network to establish an active three way call, said second means for connecting operated in response to said CPU request for said three way call to provide for connecting said first and said second custom calling subscribers while rendering said active call waiting call and said active three way call independently controlled.

2. An arrangement for multiple custom calling as claimed in claim 1, wherein said switching network comprises a digital switching network.

3. An arrangement for multiple custom calling as claimed in claim 2, wherein said digital switching network further comprises a time-space-time digital switching network.

4. An arrangement for multiple custom calling as claimed in claim 1, wherein said connection of each of said plurality of telephone subscribers includes a line circuit.

* * * * *